April 29, 1930.  J. A. REECE  1,756,798
HEAT ABSORBING MEANS FOR SHEET GLASS APPARATUS
Filed March 28, 1927
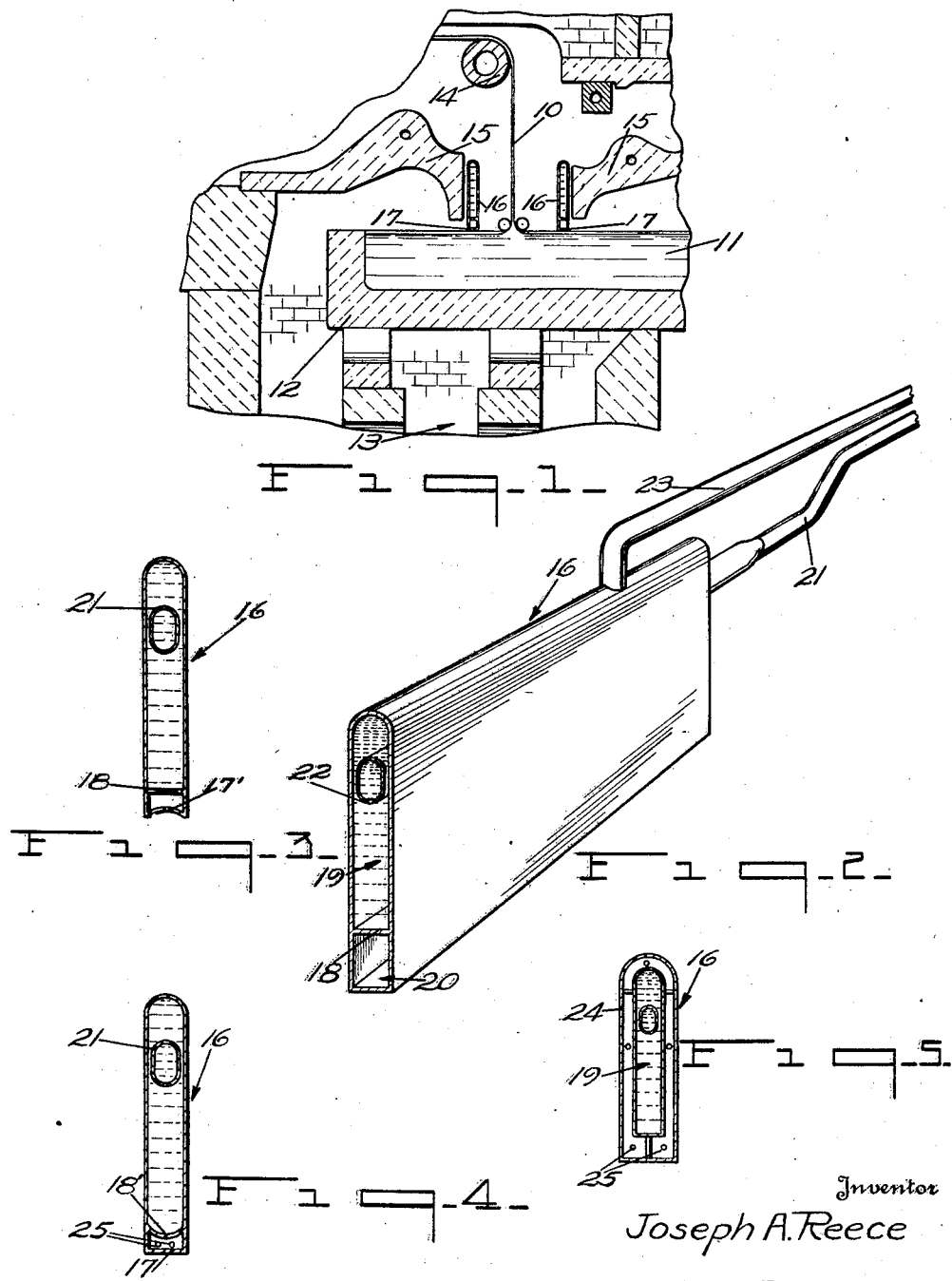
Inventor
Joseph A. Reece
By Frank Fraser
Attorney Patented Apr. 29, 1930

1,756,798

UNITED STATES PATENT OFFICE

JOSEPH A. REECE, OF TOLEDO, OHIO, ASSIGNOR TO LIBBEY-OWENS GLASS COMPANY, OF TOLEDO, OHIO, A CORPORATION OF OHIO

HEAT-ABSORBING MEANS FOR SHEET-GLASS APPARATUS

Application filed March 28, 1927. Serial No. 178,889.

This invention relates to improvements in the art of drawing sheet glass, and more particularly to an improved form of heat absorbing means or internally cooled shield for use in controlling the temperature of the glass at the sheet source.

In the Colburn process of drawing sheet glass, as set forth more particularly in the patent granted to I. W. Colburn, No. 1,248,809, December 4, 1917, a sheet of glass is drawn upwardly from a shallow pool of molten glass, and in order to control the temperature of the glass at the sheet source and chill the same to permit a more rapid rate of drawing of the sheet, a pair of water coolers in mounted parallel to, and one at each side of the sheet and closely adjacent to the molten glass from which the sheet is drawn. These coolers are of a rectangular cross-section with their narrow lower faces positioned as closely as possible to the upper surface of the pool of molten glass.

These coolers function to protect the forming glass sheet from escaping heated air currents which would otherwise destroy the sheet were it not shielded in some manner from them. The coolers also serve as a means for absorbing heat from the glass in proximity to the sheet base, thus increasing the viscosity thereof at this point.

The cooler now in use is formed of a thin metallic casing and a constant stream of water is passed therethrough. However, it is believed that these coolers have a too sharp or abrupt cooling effect on the molten glass passing thereunder and that this sudden cooling of the surface glass which is subsequently drawn upwardly into the surfaces of the sheet should be avoided.

The object of the invention is, therefore, to construct a cooler or heat absorbing shield which will have a smoother, or milder, cooling effect on the glass passing thereunder and will therefore temper the glass to such an extent that the abrupt or sharp cooling thereof will be obviated.

Another object of the invention is to provide such an improved cooler so constructed that it may be positioned relatively close to the surface of the molten glass passing thereunder in order to protect the sheet being drawn from heated air currents.

A further object of the invention is to provide such an improved cooler, divided by means of an interior partition into two compartments, an upper water cooled compartment and a lower and somewhat smaller air compartment which is positioned closely adjacent the surface of the molten glass.

Other objects and advantages of the invention will become more apparent during the course of the following description when taken in connection with the accompanying drawings.

In the drawings forming a part of this application and wherein like numerals are employed to designate like parts throughout the same—

Fig. 1 is a vertical longitudinal section through a portion of the sheet drawing apparatus showing the improved coolers in transverse vertical section.

Fig. 2 is a perspective sectional view of the cooler, and

Figs. 3, 4 and 5 disclose slightly modified forms of coolers.

The glass sheet 10 is drawn upwardly from the pool of molten glass 11 contained in a receptacle or draw pot 12 which is supported above a heating chamber 13, the molten glass within the draw pot being continuously replenished from a suitable tank furnace. The sheet 10 is then deflected about a bending roller 14 into the horizontal plane where it is carried through suitable drawing, flattening and annealing apparatus. All this is substantially as disclosed in the Colburn patent referred to above.

Lip tiles 15 are arranged over the mass of molten glass 11 and in spaced relation thereto and to each other to protect the sheet during the formative period and during the vertical run heat absorbing shields or coolers 17 are arranged parallel to the sheet 10 with their bottom edges 17 closely adjacent to the upper surface of molten glass 11. It will be understood that these improved coolers, as hereinafter described, may be used equally well in other forms of glass working apparatus than that above described.

Each cooler comprises a relatively thin metallic casing which is divided by a horizontal interior partition 18 into a pair of compartments 19 and 20 entirely separated one from the other. It will be noted that the upper compartment 19 is substantially larger than the lower compartment 20 and it is through the upper compartment that the current of cooling water or other cooling medium is passed. A pipe 21 passes through one end wall of the casing and extends substantially throughout the length of the upper portion of chamber or compartment 19. The cold water passes in through this pipe and emerges into the compartment through a plurality of openings 22. A second pipe 23 connects through the upper wall of chamber 10 adjacent one end thereof and it is through this pipe that the water passes out as it becomes heated.

It will be noted that the air compartment 20 is much smaller than the compartment 19 and is positioned adjacent to the molten glass 11. This compartment is preferably closed at its opposite ends although the ends may be open or provided with vents to permit a circulation of air through the compartment if desired.

In the operation of these coolers, they are placed at opposite sides of the sheet 10 as shown in Fig. 1 with their bottom edges 17 closely adjacent the surface of the molten glass 11. The water or other cooling medium passing through the compartment 19 will also serve to cool the air compartment 20 and this cooling will then be transmitted to the molten glass 11. By providing the air compartment 20 and thus preventing the cooling liquid from contacting directly with the bottom edge of the cooler, a softer or milder cooling action on the molten glass passing under the coolers will be obtained with the result that a too abrupt or sharp cooling of the molten glass will be obviated.

It might be said that by simply raising the coolers in the Colburn patent a slight distance away from the molten glass would serve to avoid the abrupt or sharp cooling thereof but were this done, the sheet being drawn would be exposed to heated air currents escaping from the furnace and from the heating chamber beneath the draw pot. Thus, the improved cooler provided by the present invention serves two distinct purposes. In the first place it functions to create a smoother or milder cooling of the molten glass and secondly it can be positioned relatively close to the surface of the molten glass so that it will, at the same time, protect the sheet being drawn.

In Fig. 3, the bottom edge 17' of the cooler is concaved so as to present a larger or maximum cooling surface.

In Fig. 4, the air compartment 20 is somewhat smaller than as shown in Fig. 2 and the partition 18' is concaved. It will be appreciated that the partition wall may be either convex or concave relative to the bottom edge of the cooler as desired. While the opposite ends of the air compartment are preferably closed, vents 25 may be provided therein if desired to permit the circulating of air therethrough.

In Fig. 5, the water cooled compartment 19 is entirely surrounded by an air jacket 24 and it is believed that this air jacket will eliminate to a large degree the condensation of water on the outer vertical sides of the cooler. Vents may also be provided in the opposite ends of the air jacket 24 if preferred.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A cooler for use in sheet glass apparatus, comprising a hollow casing consisting of two compartments separated by a horizontally disposed partition, and means for passing a liquid cooling medium through the upper compartment only, the lower compartment containing a gaseous medium.

2. The combination with a receptacle containing a pool of molten glass from which a sheet is vertically drawn, of a pair of coolers arranged at opposite sides of the sheet, each cooler comprising a hollow casing consisting of two compartments separated horizontally into an upper and lower compartment, and means for passing a liquid cooling medium through the upper compartment only, the lower compartment containing a gaseous medium.

3. A cooler for use in sheet glass apparatus, comprising a hollow casing, the interior of which is divided horizontally into an upper large compartment and a lower somewhat smaller air compartment, and means for passing a cooling medium through the upper larger compartment only.

4. A cooler for use in sheet glass apparatus, comprising a hollow casing, an interior partition dividing the casing adjacent its bottom edge into two compartments positioned one above the other, and means for circulating a cooling liquid through the upper compartment only.

5. The combination with a receptacle containing a pool of molten glass from which a sheet may be vertically drawn, of a pair of coolers arranged at opposite sides of the sheet, the interior of each cooler being divided horizontally adjacent its bottom edge into a water cooled compartment and an air compartment, the said air compartment being positioned relatively close to the surface of the molten glass.

Signed at Toledo, in the county of Lucas and State of Ohio, this 24th day of March, 1927.

JOSEPH A. REECE.